May 12, 1964 M. BERGER 3,132,800
OPTICAL-MECHANICAL NOMOGRAPH
Filed Dec. 14, 1960 3 Sheets-Sheet 1
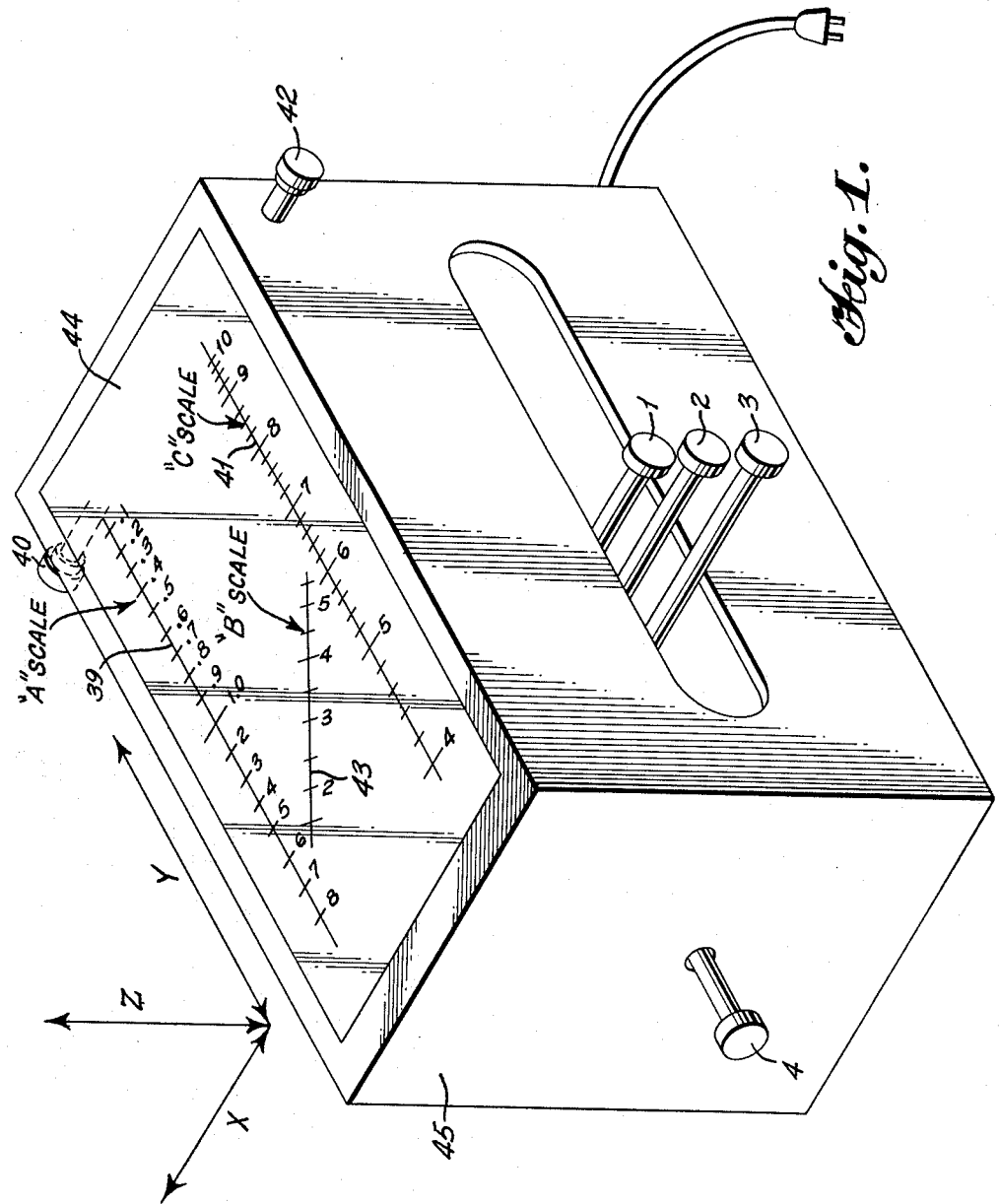
INVENTOR
Martin Berger
BY Stevens, Davis, Miller & Mosher
ATTORNEYS May 12, 1964  M. BERGER  3,132,800
OPTICAL-MECHANICAL NOMOGRAPH
Filed Dec. 14, 1960  3 Sheets-Sheet 2
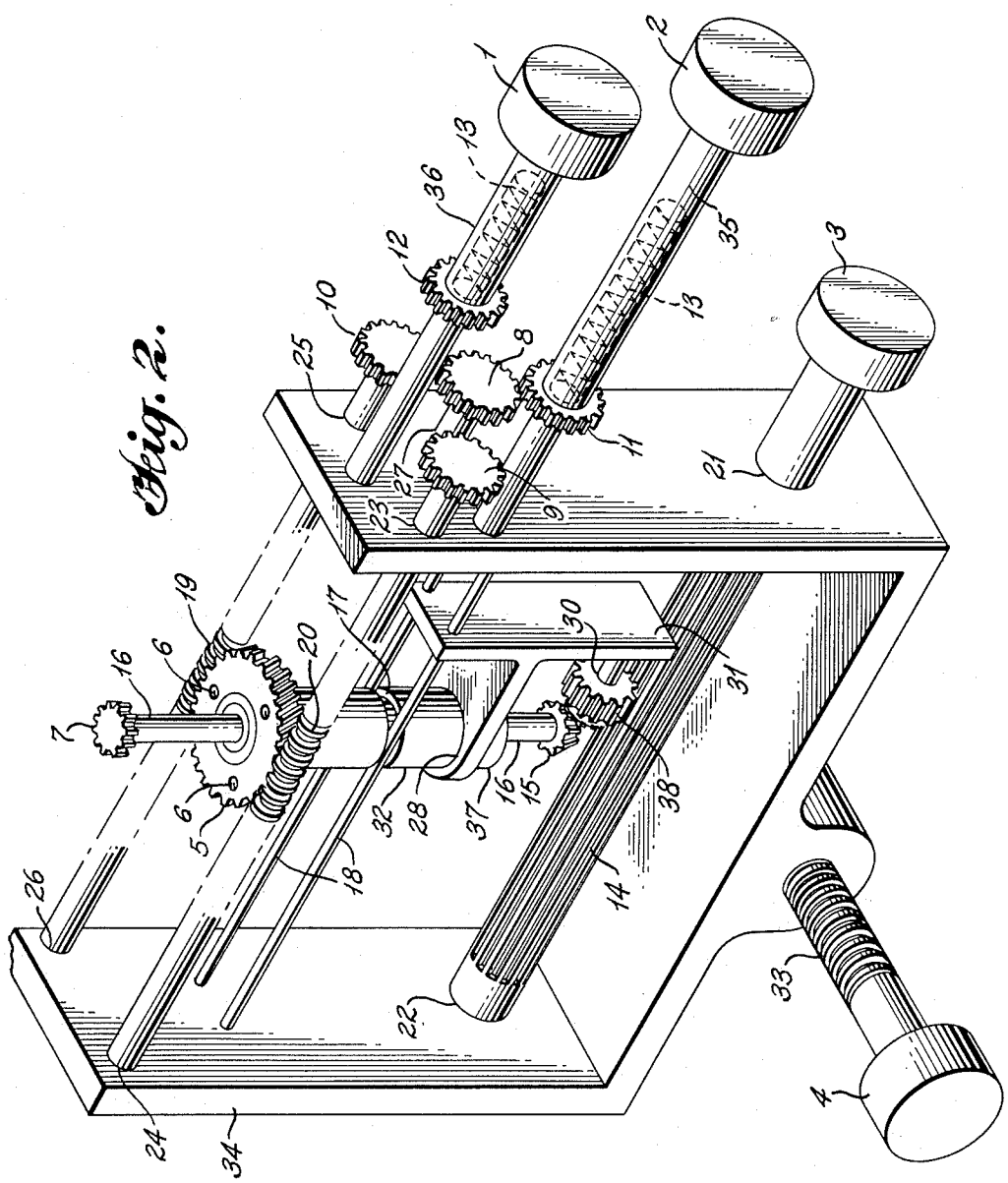
INVENTOR
Martin Berger
BY Stevens, Davis, Miller & Mosher
ATTORNEYS May 12, 1964 M. BERGER 3,132,800
OPTICAL-MECHANICAL NOMOGRAPH
Filed Dec. 14, 1960 3 Sheets-Sheet 3
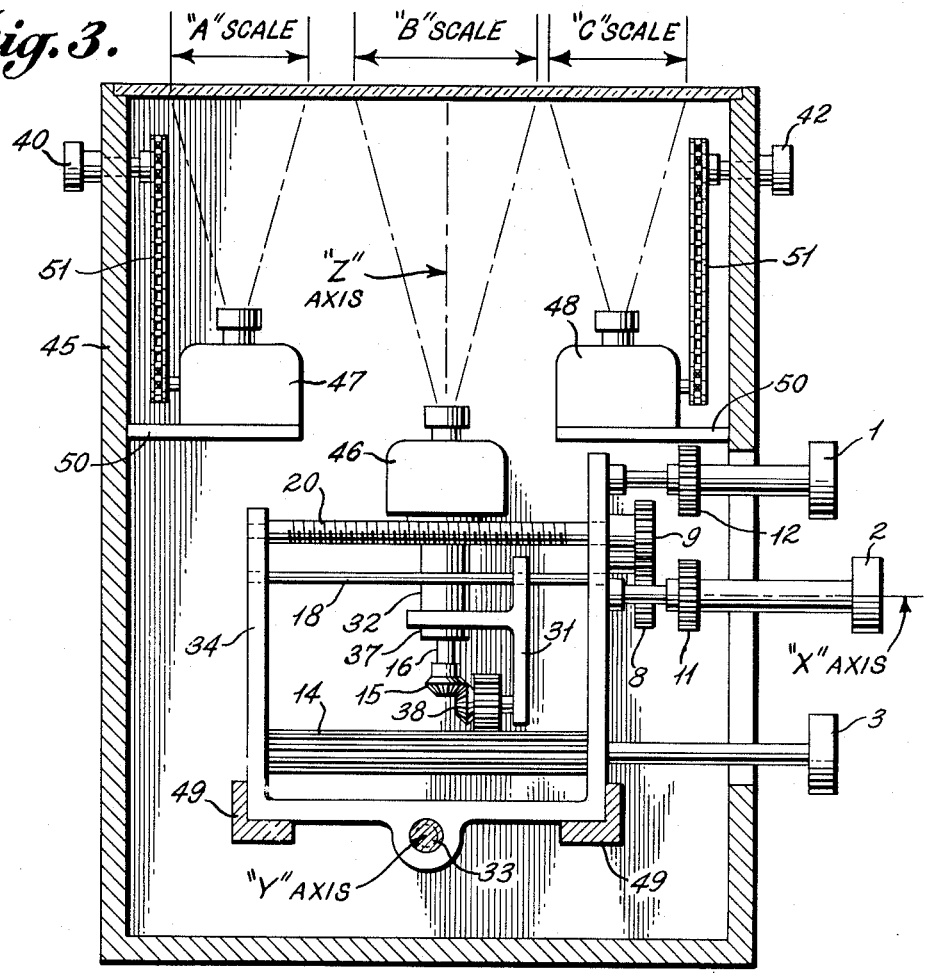
INVENTOR
Martin Berger
BY Stevens, Davis, Miller & Mosher
ATTORNEYS

3,132,800
OPTICAL-MECHANICAL NOMOGRAPH
Martin Berger, 3D Garden Terrace,
North Arlington, N.J.
Filed Dec. 14, 1960, Ser. No. 75,777
1 Claim. (Cl. 235—61)

There is a distinct need in engineering for apparatus to enable rapid calculation and solving of a variety of engineering problems. One of the convenient ways already known for accomplishing this is to make use of nomographs designed expressly for solving specific engineering problems.

It is, therefore, the principal object of the present invention to provide an optical-mechanical device for solving problems by nomographs which an operator can use efficiently and with great speed and accuracy. By the present invention the operator can select at will one of a variety of nomographs to assist him in the solving of problems.

The device of the present invention consists essentially of an optical arrangement whereby a series of nomographs are displayed sequentially on a suitable medium, such as, ground glass. Means are provided whereby a particular nomograph can be rapidly and efficiently selected and displayed on the display medium. Thereafter, the nomograph displayed can be utilized to solve an engineering problem.

Other and further objects of the present invention will become readily apparent from the following detailed description of a single preferred embodiment of the present invention when taken in conjunction with the appended drawings, in which:

FIGURE 1 shows in perspective the novel apparatus of the present invention;

FIGURE 2 shows in perspective, with the cover removed, the inner workings of the novel apparatus; and FIGURE 3 is a schematic view showing the location of the three projectors within the confines of the housing box. FIGURES 4 and 5 are schematic views illustrating the construction incorporating springs 13 in released and operation positions.

As shown in the appended drawings, the optical-mechanical nomograph constituting the present invention is comprised of a box-type housing 45 as shown in FIGURE 1. The housing 45 is provided with a ground glass plate 44 which constitutes practically the entire upper surface of the box 45 a horizontally extending slot defined in one side of the housing. Three film projectors are located within the box 45 arranged to project optically an image onto the ground glass surface 44 the first projector adjacent the side of the housing featuring a horizontal slot as shown in FIGURE 1, the second projector adjacent the side opposite said one side, and the third, in between the first and second projectors. These film projectors are conventional in all respects and are utilized with strips of films, such as, conventional 35 mm., 16 mm., 8 mm. film or the like, provided with sprocket holes on one or both sides. The film is subdivided into frames, as is conventional, and each frame contains a negative of a scale to be projected onto the ground glass surface 44 by suitable and conventional optical means. Since the film projectors are conventional in all respects, details of them have been left out for simplicity's sake. Suffice it to say that any well-known and recognized equipment that will project an image onto the ground glass plate 44 can be utilized for this purpose. In the particular specific preferred embodiment, the projector for the A scale and the projector for the C scale are arranged in a fixed relationship within the box 45. The knob 40 and its associated shaft are connected with the projector for the A scale for the purpose of advancing the film strip threaded therein. By the same token, knob 42 and its associated shaft serve to advance the film strip threaded in the projector for the C scale.

The inner workings of the apparatus consist of an arrangement whereby the intermediate or B scale can be shifted in both the X and Y directions with reference to the A and C scales. Also, the B scale can be tilted at any angle and moved into any relative position with respect to the A and C scales. The projector for the B scale is therefore associated with a mechanism which will permit the projector to be moved in both the X and Y directions and rotated. This apparatus is shown more clearly in FIGURE 2.

The projector is not shown but mounts on the projector platform 5 by means of tapped holes 6.

Movement in the X direction is accomplished in the following manner. X knob 2 is pushed toward the carriage 34 and gear 11 attached to hollow shaft 35 moves with it until it engages gears 8 and 9. Gear 9 is attached to lead screw 20 which turns on bearings 23 and 24. Gear 8 is an idler gear turning on bearing 27 and is permanently meshed with gear 10. Gear 10 is attached to lead screw 19 which turns on bearings 25 and 26. Thus, when the X knob 2 is pushed in and turned, both lead screws 19 and 20 turn in opposite directions. Projector platform 5 is a gear which meshes with both lead screws and therefore moves in the X direction.

A spring 13 disengages gear 11 from gears 8 and 10 when the X knob is released. Guide pins 18, riding in groove 17 of cylinder 32 which is fixed to platform 5, keep the platform in the proper plane.

The platform 5 may be revolved in the following manner. Z knob 1 is pushed toward carriage 34 and gear 12 which is attached to hollow shaft 36 moves with it until it engages gears 9 and 10. Thus, when Z knob 1 is pushed in and turned, lead screws 19 and 20 turn in the same direction at an equal rate thereby revolving platform 5.

The platform 5 may be moved in the Y direction by revolving Y knob 4. This knob is attached to a lead screw 33 which moves the entire carriage 34 in the Y direction.

Provision for transporting the film in the B scale projector is as follows. A gear 7 extending from the platform 5 into the projector turns the film transport mechanism within the projector. This gear 7 is fixed to a shaft 16 which extends through the cylinder 32 and rides in bearings 29 and 37. At the bottom end of shaft 16 is fixed a bevel gear 15 which meshes with a combination bevel and straight gear 38. This gear 38 acts as an idler, turning on a bearing 30, and is permanently meshed with spline gear 14. Gear 14 turns on bearings 21 and 22 and is fixed to B film transport knob 3. Thus, revolving knob 3 revolves gear 7 which moves the film in the projector. Bracket 31 is used to keep gear 38 at proper position with respect to gear 15. Bearing 28 permits rotation of cylinder 32 and guide pins 18 through holes in bracket 31 keep gear 38 in alignment with spline 14 so that film transport mechanism is effective at any place along the X axis.

Provision may be made for photographic reproduction of nomographs set up on the instrument and also provision may be made for more than three scales, and more than one movable scale.

Although the present invention has been shown and described in terms of a single preferred embodiment, it will be appreciated that various modifications and changes can be made without departing from the spirit, scope and contemplation of the invention. Accordingly, such changes are deemed to come within the purview of the inventive concepts taught herein.

What is claimed is:

An optical-mechanical nomograph apparatus comprising a box-type housing, a ground plate glass forming the upper housing surface, a horizontally extending slot defined in one side of the housing, three film projectors located within said box-type housing, the first adjacent said one side, the second adjacent the side opposite said one side, and the third in between the first and second projectors, each of the said projectors containing a strip film having a plurality of frames each comprising a valued scale, and strip film advancing means, the projectors being oriented to project the frames onto said ground glass, a U-shaped carriage positioned normal to said one side within the box-type housing, a threaded bore defined in the interconnecting web portion of the U-shaped carriage, a lead screw received in said threaded bore and projecting from a side of the housing adjacent said one side, a spline shaft journalled in the legs of the carriage and projecting through said slot, a first bevel gear in engagement with said splined shaft, a second bevel gear in engagement with said first bevel gear, an axle extending vertically terminating above the legs of the U-shaped carriage, a gear mounted on the top of said axle and said second bevel gear mounted on the bottom end of said axle, bracket means located between the legs of the carriage upon which said first and second bevel gears and said axle are mounted, means mounting said bracket means for sliding movement parallel to the axis of the said splined shaft, threaded leads parallel with said splined shaft and journalled in the legs of the carriage and projecting beyond the leg nearest said one side, a gear mounted on the projected end of each of said parallel spaced threaded leads, a circular gear wheel mounted on said bracket means and in meshing engagement with said parallel spaced threaded leads, the third film projector fixed to said circular gear wheel with the gear mounted on the top end of the axle operatively engaging the strip film advancing means, means projecting from the housing operatively engaging the strip film advancing means for the other two film projectors, first and second shaft means mounted on the leg of the carriage adjacent said one side and projecting through said slot, gear means for coupling said first shaft means to drive said parallel spaced threaded leads in the same direction and for coupling said second shaft means to drive said parallel spaced threaded leads in opposite directions.

References Cited in the file of this patent
UNITED STATES PATENTS

| | | |
|---|---|---|
| 2,111,516 | Roux | Mar. 15, 1938 |
| 2,600,261 | Pennington | June 10, 1952 |
| 2,635,806 | Lermer | Apr. 21, 1953 |
| 2,740,325 | Simjian | Apr. 3, 1956 |